United States Patent
Falk

(10) Patent No.: US 10,622,833 B2
(45) Date of Patent: Apr. 14, 2020

(54) NETWORK SUBSCRIBER NETWORK USING ZERO CROSSING FOR CONTROL OF POWER EXCHANGE

(71) Applicant: SMA Solar Technology AG, Niestetal (DE)

(72) Inventor: Andreas Falk, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 16/285,683

(22) Filed: Feb. 26, 2019

(65) Prior Publication Data

US 2019/0190314 A1    Jun. 20, 2019

Related U.S. Application Data

(63) Continuation of application No. PCT/EP2018/064925, filed on Jun. 6, 2018.

(30) Foreign Application Priority Data

Jun. 6, 2017    (DE) ................ 10 2017 112 438

(51) Int. Cl.
*H02J 13/00* (2006.01)
*H02J 3/12* (2006.01)
(Continued)

(52) U.S. Cl.
CPC ............ *H02J 13/0051* (2013.01); *H02J 3/12* (2013.01); *H02J 3/14* (2013.01); *H04W 56/00* (2013.01); *H02J 2003/146* (2013.01)

(58) Field of Classification Search
CPC .... H02J 13/0051; H02J 3/14; H02J 2003/146; H02J 3/12; H04W 56/00
See application file for complete search history.

(56) References Cited

U.S. PATENT DOCUMENTS

5,239,252 A * 8/1993 Runggaldier ........... H02P 27/02
                                                         318/806
6,320,507 B1 * 11/2001 Strzelec ............. G08B 13/2488
                                                         340/10.1
(Continued)

FOREIGN PATENT DOCUMENTS

DE        19502786 A1    8/1996
WO        0163722 A1     8/2001

OTHER PUBLICATIONS

Stastny, Ladislav, et al. "Time synchronization in power-line communication." IFAC—PapersOnLine 48.4 (2015): 83-88. (Year: 2015).*

(Continued)

*Primary Examiner* — Michael D Masinick
(74) *Attorney, Agent, or Firm* — Eschweiler & Potashnik, LLC

(57) ABSTRACT

A network subscriber unit for an electrical energy supply network includes a control unit configured to control the power exchange of the network subscriber unit with the energy supply network, a device configured to determine a voltage zero crossing at a connection point of the network subscriber unit with the energy supply network and a receiving unit of the network subscriber unit configured to receive a signal of a reference time. The control unit is in this case configured to determine a time offset between a time of the voltage zero crossing determined by the device and the received reference time and to control the power exchange based on the time offset.

9 Claims, 3 Drawing Sheets

(51) Int. Cl.
*H02J 3/14* (2006.01)
*H04W 56/00* (2009.01)

(56) References Cited

U.S. PATENT DOCUMENTS

| | | | |
|---|---|---|---|
| 6,734,784 B1* | 5/2004 | Lester | H02J 13/0034 340/12.33 |
| 7,551,460 B2* | 6/2009 | Lalithambika | H02M 3/33523 323/286 |
| 2008/0218148 A1* | 9/2008 | Robertson | H02J 3/14 323/349 |
| 2014/0146427 A1* | 5/2014 | Huang | H02H 1/0061 361/83 |
| 2015/0280434 A1 | 10/2015 | Walter | |
| 2016/0204651 A1 | 7/2016 | Panchen | |
| 2016/0329711 A1 | 11/2016 | Majumder | |

OTHER PUBLICATIONS

Giammatteo, Paolo, Concettina Buccella, and Carlo Cecati. "A Proposal for a Multi-Agent based Synchronization Method for Distributed Generators in Micro-Grid Systems." EAI Endorsed Trans. Indust. Netw. & Intellig. Syst. 3.7 (2016): e5. (Year: 2016).*
International Search Report dated Aug. 8, 2018 in connection with International Application PCT/EP2018/064925.

* cited by examiner

NETWORK SUBSCRIBER NETWORK USING ZERO CROSSING FOR CONTROL OF POWER EXCHANGE

CROSS REFERENCE TO RELATED APPLICATIONS

This application is a continuation of International Patent Application number PCT/EP2018/064925, filed on Jun. 6, 2018, which claims priority to German Patent Application number 102017112438.1, filed on Jun. 6, 2017, and is hereby incorporated by reference in its entirety.

FIELD

The disclosure relates to a network subscriber unit for an electrical energy supply network.

BACKGROUND

As is known, the stability of electrical energy supply networks requires that the sum of the power fed in corresponds to the sum of the power drawn. The operators of the energy supply networks therefore control the energy fed in or power drawn in order to maintain this balance. If there is an imbalance, the network frequency changes. If, for example, the energy drawn exceeds the energy fed in, the network frequency decreases, and if the energy fed in exceeds the energy drawn, the network frequency increases.

Since the proportion of decentrally generated energy in Germany is continually increasing, the number of feeders that the grid operator can access directly in order to control their fed-in power is decreasing. Therefore, it is a normative requirement for many decentralized energy producers that they independently control the fed-in power depending on network parameters, in particular the network frequency.

Document EP 2875560 A1 further proposes that consumers also determine the network frequency at their network connection point and compare it with a base value. As a result of the comparison, the consumers control the draw of electrical energy from the energy supply network and thus independently contribute to achieving the balance.

Since the network frequency must be the same within the entire connected energy supply network, this control method can only help to maintain a balance within the entire network. Regionally, there may therefore be a significant imbalance between infeed and consumption of electrical power, which must be compensated for by transmission of electrical power between the regions. Since the capacity of transmission lines between remote sections of the energy supply network is limited, it may happen that these transmission lines are overloaded even though there is a balance between infeed and consumption within the entire network. This is the case if, for example, in the north of Germany a lot of energy is fed into the network without an adequate consumption being realized there and in the south of Germany a lot of energy is drawn from the network without an adequate infeed being realized there.

It is therefore desirable to provide control mechanisms for the infeed and drawing of power into or from an energy supply network that are suitable for ensuring the balance between the infeed and drawing at the regional level as well so that an increase in capacities in transmission lines between remote network regions becomes unnecessary.

The voltage at this point is an insufficient or less suitable indicator because medium-voltage and high-voltage transformers are often equipped with control devices that change the transformation ratio in operation in order to stabilize the local voltage. Because of such voltage control interventions, it is not reliably possible to derive an energy flow direction from the instantaneous voltage.

SUMMARY

The disclosure is directed to providing a network subscriber unit that can set an energy exchange with an energy supply network in such a way that a regional balance between power fed into the energy supply network and energy drawn therefrom is sought.

A network subscriber unit according to the disclosure for an electrical energy supply network comprises a control unit configured to control the power exchange of the network subscriber unit with the energy supply network, and a device configured to determine a voltage zero crossing at a connection point of the network subscriber unit with the energy supply network. The network subscriber unit further comprises a receiving unit configured to receive a signal of a reference time. The control unit is configured to determine a time offset of a time of the voltage zero crossing determined by the device and the reference time and to control the power exchange depending on the time offset.

In one embodiment the reference time is determined on the basis of the time of a voltage zero crossing of the energy supply network in a connection region or at a connection point at which a network region is connected to a transmission line between network regions, in particular to a line at the highest voltage level. The time offset between the time of the voltage zero crossing at the network connection point of the network subscriber unit and the reference time can then serve as a measure of the extent to which there is a balance between infeed and consumption within the network region.

If more energy is generated within the network region than consumed, the time of the voltage zero crossing at the network connection point of the network subscriber unit will tend to lead the voltage zero crossing at the connection point of the network region. To put it clearly, the units connected in the network region are trying collectively to increase the network frequency with their infeed or consumption behavior, that is to say to accelerate the network. If the consumption within the network region is higher than the generation, the time of the voltage zero crossing at the network connection point of the network subscriber unit will tend to lag the voltage zero crossing at the connection point of the network region. To put it clearly, the network subscribers in the network region try to reduce the network frequency, that is to say to slow down the network.

It should be noted here, however, that sudden phase changes in the voltage can occur within the energy supply network. For example, at transformer stations for the implementation of the network voltage, such sudden phase changes of the voltage and thus a time offset of the voltage zero crossing can occur (for example when using transformers with a DY5 switching group). It is therefore advantageous that the control unit of the network subscriber unit according to the disclosure aligns the power exchange with the energy supply network with reference to a base value of the time offset. This base value takes into account a phase shift between the reference time and the voltage zero crossing, said phase shift not being due to an imbalance between regional infeed and regional consumption.

If the time offset determined at the connection point of the network subscriber unit is smaller than the base value, the control unit concludes that there is more infeed than consumption or more infeed than desired in the network region, and reduces the infeed of the network subscriber unit or increases the consumption thereof. Conversely, the control unit responds by reducing the consumption or increasing the infeed if the time offset is above the base value, that is to say if the time offset changes in the direction of a voltage zero crossing lagging the reference time.

In principle, however, the reference time does not have to be determined on the basis of the time of a voltage zero crossing of the energy supply network in a connection region or at a connection point. The reference time can thus also be ascertained by averaging voltage zero crossings at a plurality of connection points locally separated from one another, for example connection points of the network region to different transmission lines. It is also conceivable to determine this reference time based on other network parameters, for example based on a transmission power determined at measuring points, in order to collectively influence the power exchange of all network subscriber units according to the disclosure within the relevant network region in the desired manner.

In one embodiment the receiving unit in the network subscriber unit is embodied as a radio receiver. In this way, additional cabling outlay is avoided and the construction of an infrastructure for transmitting a correct reference time is kept low. However, a wired transmission of the reference time is not excluded.

In one embodiment of the disclosure, the receiving unit is configured to take a propagation time of the signal between a transmitter of the reference time signal and the receiving unit into account in the determination of the reference time. This is particularly important if the physical distance between the transmitter of the reference time and the network subscriber unit is so large that the propagation time of the signal for the reference time is relevant for the correct determination of the time offset. The distance between the transmitter of the reference time signal and the receiving unit can be stored in the network subscriber unit or determined independently by the network subscriber unit, for example by virtue of the network subscriber unit determining its position absolutely (for example by way of a GPS signal) or determining its position relative to one or a plurality of transmitters with previously known positions (for example by way of triangulation).

Instead of the zero crossing of the voltage, the peak or any other phase position can also be used as the basis for determining the time offset. Therefore, the term voltage zero crossing in the context of this application is intended not only to include the specific time at which the AC voltage changes polarity but each time of the phase profile of the AC voltage in a fixed relationship therewith, which is used as a reference point for determining the time offset. The corresponding time can be determined, for example, by means of a PLL (phase-locked loop) algorithm.

In one embodiment of the disclosure, the network subscriber unit is embodied as a feeder, for example as a wind power plant, photovoltaic system or cogeneration unit. In this case, the control unit controls the infeed of electrical energy into the energy supply network.

In a further embodiment of the disclosure, the network subscriber unit is embodied as a consumer. In this case, the control unit controls the consumption of the network subscriber unit.

In yet another embodiment of the disclosure, the network subscriber unit comprises an energy store, wherein the control unit is configured to control the power exchange with the energy supply network by means of charging or discharging the energy store. Advantageously, the control unit of the network subscriber unit is configured in this case so that it diverts the generated energy, which should not be fed into the energy supply network due to the specific time offset, partially or completely into the energy store in order to charge the same. The control unit may likewise be configured so that it draws electrical energy, which cannot be generated at a given time but is to be fed into the energy supply network, from the energy store so that it is discharged. Analogously, the control unit can ensure that consumers of the network subscriber unit receive electrical energy from the energy store if it is not to be drawn from the energy supply network due to the determined time offset. Of course, the control unit can also ensure that the energy store is charged from the energy supply network when the determined time offset favors a draw of power from the energy supply network.

In addition to controlling the power exchange with the energy supply network, the network subscriber unit can also be configured to accumulate the exchanged power over a prescribed time period weighted with a price factor, wherein the price factor is determined as a function of the time offset. In this way, the function of an energy meter can also be realized by the network subscriber unit at the same time, and a variable price can be assigned for billing purposes with the energy supplier of the energy fed in or drawn, said variable price depending on the respective supply situation within the network region. Behavior of the network subscriber unit contributing to the stability of the network region, that is to say to the balance between regional consumption and regional infeed, can thus be rewarded by financial incentives, thus correspondingly financially sanctioning a behavior that destabilizes the network region.

In one embodiment the control unit can be configured to ascertain the base value of the time offset by averaging the determined time offset over a prescribed time period and to control the power exchange depending on a difference between the currently determined time offset and the base value. The determination of the base value can be repeated at regular or irregular intervals to take into account, for example, changed boundary conditions, for example a change in the infrastructure of the network region through the addition or removal of other network subscribers, transformer stations or network sections. The ascertainment of the base value is thus performed adaptively in this case.

In peripheral sections of the network, the bandwidth of the phase difference between maximum draw and maximum local generation may be greater than at central network nodes. Therefore, the monetary valuation in the form of the price factor shall be performed relative to the total bandwidth of the occurring phase differences. For this reason, a larger phase difference should lead to the same monetary valuation, that is to say to the same fluctuation range of the price factor, in peripheral sections of the network as at central network nodes. Valuation parameters are thus the base phase and the phase bandwidth rightly occurring at a network node.

In one embodiment of the disclosure, the control unit is configured to determine a bandwidth of the time offset and to scale the price factor depending on the bandwidth. For this purpose, the control unit can observe the values of the time offset over a prescribed time period, in particular without actively controlling the power exchange as a function of the time offset in the process. Subsequently, a first price factor can be assigned to the mean value of the time offset and a second price factor can be assigned to an extreme value or values statistically linked to the bandwidth and deviating from the mean value (for example by a standard deviation σ). These two price factors can then form the reference points for the assignment of price factors for other values of the time offset, for example by way of linear interpolation. In particular, the reference points for the price factor can be selected so that a higher price factor is used in the case of a lagging voltage zero crossing at the network connection point of the network subscriber unit, that is to say in the case of a time offset value that is increased compared to the mean value, and a lower price factor is used as a basis for the specific power exchange in the case of a leading voltage zero crossing, that is to say in the case of a time offset value that is shorter compared to the mean value. Thus, an increased infeed is favored economically in the lagging network state, while an increased consumption is accordingly disadvantaged in this case. In the case of a leading network state, infeed and consumption are valued economically in a precisely converse manner. By controlling the power exchange, the network subscriber unit can thus contribute to network stabilization by means of economically advantageous operation.

In addition to the control of the power exchange with the energy supply network depending on the time offset, the network subscriber unit can control the power exchange in a previously known manner depending on other network parameters, in particular the network frequency and/or the voltage amplitude.

A further aspect of the disclosure is based on determining and monitoring power flows within the network by means of a network subscriber unit or a plurality of network subscriber units. A network subscriber unit for an electrical energy supply network according to one embodiment of the disclosure comprises a device for determining a voltage zero crossing at a connection point of the network subscriber unit with an energy supply network, and a receiving unit for receiving a signal of a reference time. The network subscriber unit is configured to determine the time of the voltage zero crossing relative to the reference time and to store this time and provide said time for immediate or later transmission. The network subscriber unit detects a multiplicity of voltage zero crossings and determines, stores and transmits therefrom a network frequency as well as a time profile of a phase of the voltage zero crossing.

An evaluation unit, which may be part of the network subscriber unit or an independent unit arranged remotely from the network subscriber unit, receives the data about the times of the voltage zero crossing or about the network frequency and/or the time profile of the phase from a plurality of network subscriber units. From this data, the evaluation unit determines information about a phase offset between the voltage zero crossings of in each case two of said network subscriber units depending on the reference time and from this generates information about a time profile of the phase offsets. The evaluation unit is furthermore configured to determine from the time profile of the phase offsets a time profile of power flow changes of network sections extending between the corresponding network subscriber units. By calibrating the information about the phase offset between each two of the network subscriber units, for example by determining a reference phase offset with known power flow in the relevant network section, a present power flow in this network section can be concluded. In one embodiment this calibration is carried out by the evaluation unit so that, after the calibration, it is able to ascertain information about power flows in the relevant network sections between the respective network subscriber units.

The quality of the calibration can be improved by determining phase offsets at several known power flows, particularly when these power flows represent extreme values of permissible power flows. Alternatively, knowledge or justified assumptions about an impedance of the relevant network section can be used to perform or to improve the calibration.

The precision with which the time of a voltage zero crossing is determined can also be increased by determining the times of a plurality of voltage zero crossings and averaging said times assuming a constant network frequency during the determination of the times of the plurality of voltage zero crossings.

In a first embodiment of this aspect of the disclosure, a first network subscriber unit is arranged on a first side of a transformer and a second network subscriber unit is arranged on a second side of the transformer. In this configuration, the power flow via the transformer can be monitored by the evaluation unit.

In one embodiment, the evaluation unit is configured to generate a warning signal and to transmit it to a communication partner when the power flow determined from the phase offset in a network section is outside a permissible value range for this network section. As a result, overloading of a network section or of network components arranged in the network section can be indicated, for example, and ideally avoided by way of a suitable counter-reaction.

In a further embodiment, the evaluation unit transmits the determined power flow information to a superordinate unit or also to the network subscriber unit itself. In the latter case, the network subscriber units can change their infeed behavior depending on the transmitted power flow information, in particular can counteract an undesired power flow. The superordinate unit can also take appropriate measures to counteract undesired power flows.

A method associated with the further aspect comprises the following acts. In a first network subscriber unit, a first time of a voltage zero crossing of an energy supply network connected to the first network subscriber unit is determined relative to a reference time signal receiving in the first network subscriber unit. In a second network subscriber unit, a second time of a voltage zero crossing of an energy supply network connected to the second network subscriber unit is determined relative to the reference time signal receiving in the second network subscriber unit. A power flow in a network section connecting the first and the second network subscriber unit is determined from the difference in the times. For this purpose, a calibration can be used by determining a time difference with known power flow and/or knowledge or assumptions about a line impedance of the connecting network section. If the ascertained power flow is outside a permissible value range, a warning signal can be generated and transmitted.

BRIEF DESCRIPTION OF THE DRAWINGS

In the following text, the disclosure is illustrated with the aid of figures, in which.

DETAILED DESCRIPTION

Figure 1:
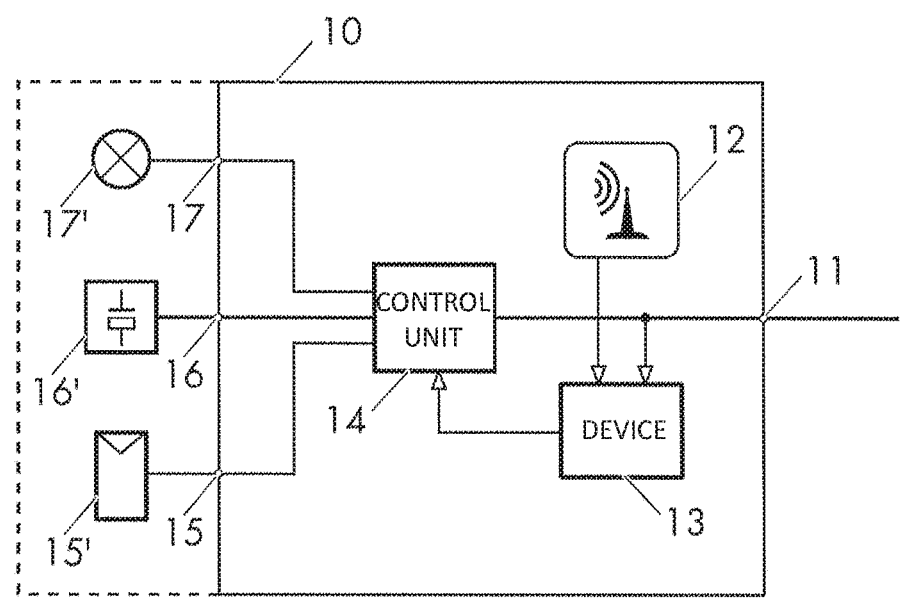
FIG. 1 illustrates a network subscriber unit according to the disclosure.

FIG. 1 shows an internal design of a network subscriber unit 10 according to the disclosure. The network subscriber unit 10 has a connection point 11 for connection to an energy supply network. This connection can be effected on one phase or on three phases. A device 13 is connected to the connection point 11 in order to determine the time of a voltage zero crossing of the energy supply network connected to the connection 11. Furthermore, the network subscriber unit 10 has a receiving unit 12 capable of receiving an external time signal, in particular as a radio signal. The time signal is forwarded to the device 13 in which it is compared with the time of the voltage zero crossing in order to determine the time offset between these two times. The result of the comparison is forwarded to a control unit 14 of the network subscriber unit 10, which in turn is connected via connections 15, 16, 17 to consumers 17', generators 15' and/or energy stores 16'. The control unit 14 controls the power exchange via the connection point 11 between the energy supply network and the consumers 17', generators 15' and/or energy stores 16' depending on the time offset. For this purpose, the control unit 14 can individually or jointly change the power flows via the connections 15, 16, 17 in order to control the power exchange with the energy supply network. The consumers 17', generators 15' and/or energy stores 16' can in this case be part of the network subscriber unit 10, whereby this acts as a feeder, consumer or store, or the network subscriber unit 10 can be an independent device to which these components are connected and which controls these components.

Figure 2:
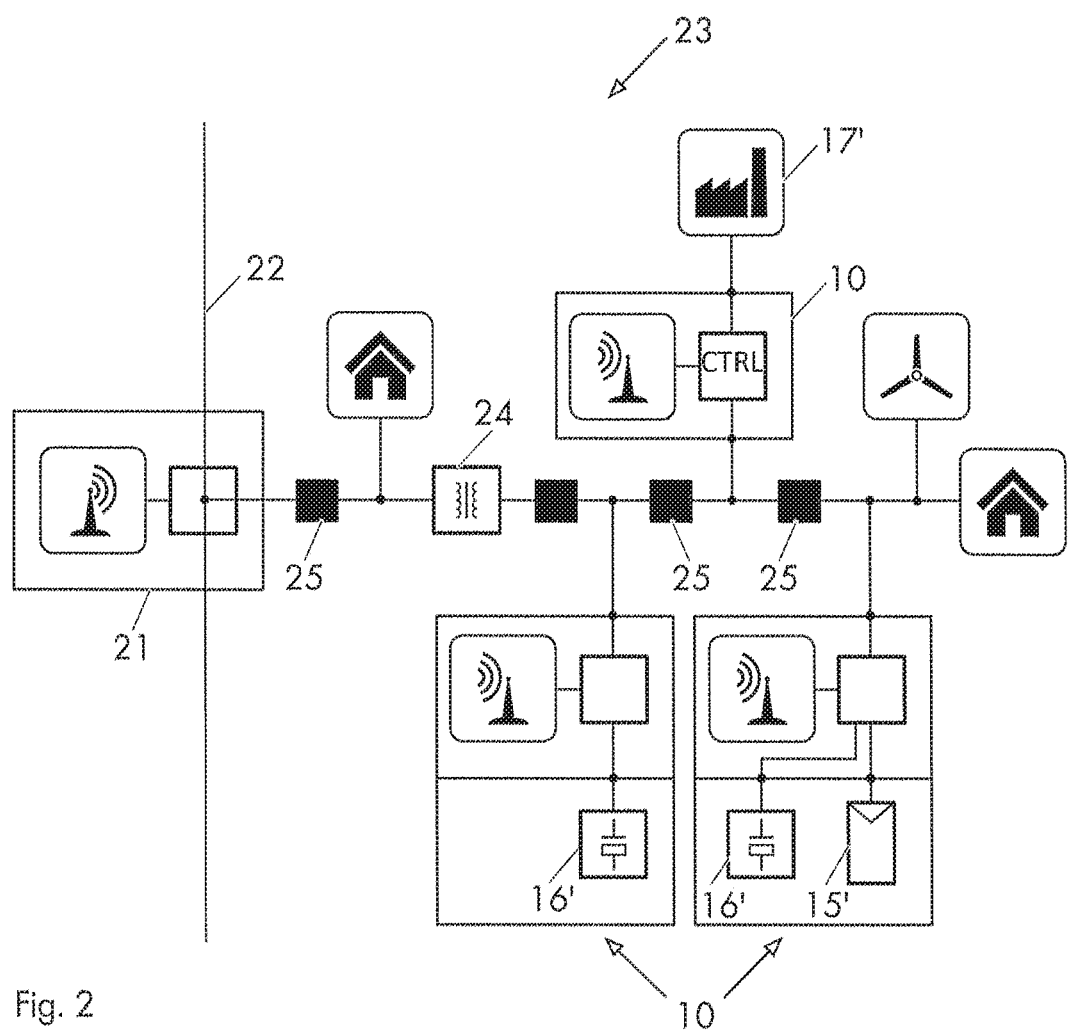
FIG. 2 illustrates a schematic illustration of a network region of an energy supply network and FIG. 3 illustrates a voltage profile at different points of the energy supply network.

Network subscriber units 10 according to the disclosure can be used at different locations within a network region 23, as illustrated schematically in FIG. 2. The network subscriber units 10 according to the disclosure can be used in any combination with other network subscriber units according to the disclosure but also with network subscriber units not according to the disclosure. These may include consumers, generators and/or stores of electrical power. Thus, in the embodiment shown in FIG. 2, the network subscriber unit 10 connected to the consumer 17' is embodied as an independent unit while other network subscriber units 10 according to the disclosure have stores 16' and/or generators 15'.

The network region 23 is connected to a transmission line 22 at a connection point at which a transmitter 21 is simultaneously arranged. The transmitter 21 in this case transmits a radio signal containing a reference time as signal information. In one embodiment the reference time is determined based on a zero crossing of the voltage of the transmission line 22.

The different network subscriber units 10 according to the disclosure receive this radio signal and evaluate it with respect to the reference time. Here, the propagation time of the radio signal due to the physical distance between the transmitter and the receiver is respectively taken into account.

Within the network region 23, the impedance of the energy supply network is represented in the form of discrete network impedances 25. These cause a phase shift in the energy supply network, said phase shift depending on the power flowing at the location of the network impedance 25. Further phase shifts, which may also include power-independent components, can be caused by transformers 24 that adjust voltage levels within the energy supply network. The phase shifts of the network impedances 25 and transformers 24 add up along the lines within the network region so that the phase shift between different points of the energy supply network provides a measure of the direction and magnitude of network power flow between these points and thus a local imbalance between infeed and consumption is in the region of at least one of these points.

Figure 3:
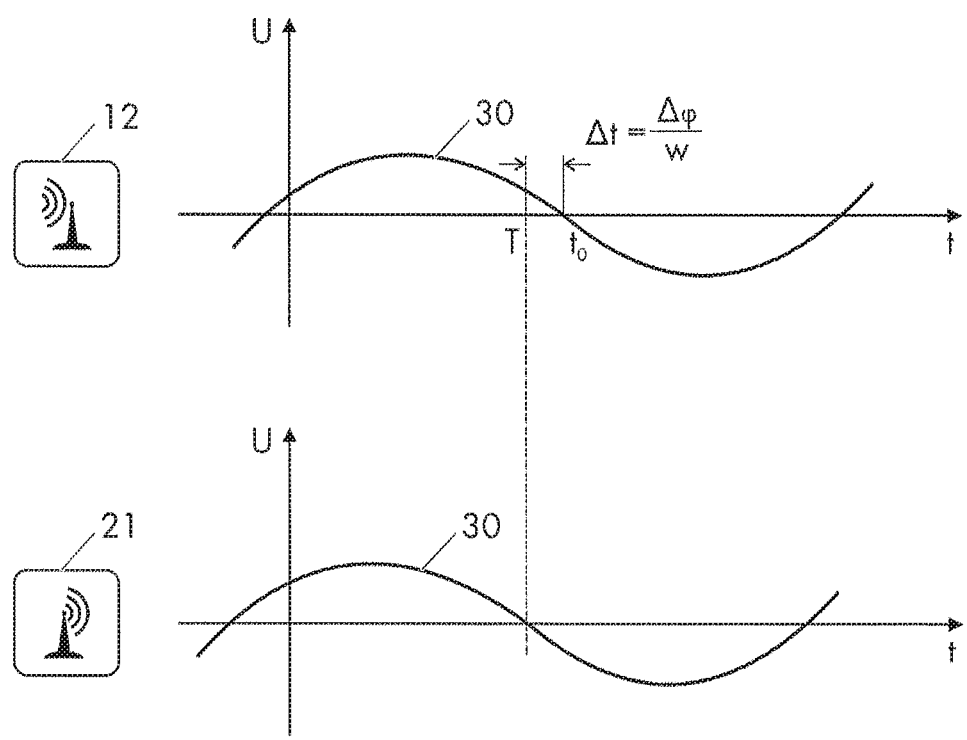

FIG. 3 shows temporal voltage profiles 30 at the location of the transmitter 21 in the lower graph and at the location of the receiving unit 12 of a network subscriber unit 10 in the upper graph. Compared with the voltage zero crossing at the location of the transmitter 21 at the time T, the voltage zero crossing at the location of the receiving unit 12 or of the network subscriber unit 10 instead takes place at the time t0, which is later by a time offset $\Delta t = t0 - T = \Delta \varphi / w$. In this case, w corresponds to the network frequency and $\Delta \varphi$ corresponds to the phase offset. The phase offset or the time offset can be divided into a proportion that depends on the state of balance between infeed and consumption in the network region and a proportion independent thereof. The independent proportion can be determined in the manner described above and taken into account as the base value. The power exchange of the network subscriber unit 10 according to the disclosure with the network is preferably determined exclusively by the dependent component so that an imbalance between infeed and consumption in the network region is counteracted. The phase offset can vary as a function of the time within a fluctuation range depending on how the load distribution within the network region 23 varies.

FIG. 3 can also be used to explain the determination of a power flow according to the further aspect of the disclosure. Here, the voltage profiles 30 illustrated are to be understood as voltage profiles at the location of two network subscriber units 10, which both comprise a receiving unit 12 as in FIG. 1. The reference time signal in this case does not need to have reference to the voltage zero crossing at another location of the energy supply network, but can be, for example, the time signal of an atomic clock that is transmitted by GPS radio signal. The network subscriber unit associated with the upper graph determines the voltage zero crossing at a time t0 while the network subscriber unit associated with the lower graph determines the voltage zero crossing at a time T. The time offset $\Delta t = t0 - T = \Delta \varphi / w$ depends here on the power flow in the network section and its line impedance, in particular its inductance, which connects the two network subscriber units. If, for example, the associated time offsets $\Delta t$ are known for two power flow values, an associated power flow can also be assigned by way of interpolation or extrapolation to any other time offset. It should be noted here that a time offset of zero also does not necessarily have to be assigned to a power flow of zero, in particular if a transformer that can cause a step in the network phase is arranged between the network subscribers. In this case, a time offset or phase offset deviating from zero can also be associated with a power flow of zero.

The invention claimed is:

1. A network subscriber unit for an electrical energy supply network, comprising:
    a control unit configured to control the power exchange of the network subscriber unit with the energy supply network,
    a device configured to determine a voltage zero crossing at a connection point of the network subscriber unit to the energy supply network, and
    a receiving unit configured to receive a signal of a reference time, wherein the receiving unit comprises a radio receiver, and
    wherein the control unit is configured to determine a time offset between a time of the voltage zero crossing determined by the device and the reference time, and is further configured to control the power exchange based on the time offset.

2. The network subscriber unit as claimed in claim 1, wherein the receiving unit is configured to take a propagation time of the signal between a transmitter of the reference time signal and the receiving unit into account in the determination of the reference time.

3. The network subscriber unit as claimed in claim 1, wherein the network subscriber unit comprises a feeder.

4. The network subscriber unit as claimed in claim 1, wherein the network subscriber unit comprises a consumer.

5. The network subscriber unit as claimed in claim 1, wherein the control unit is configured to increase a feed into the energy supply network or to reduce a draw from the energy supply network when the time offset changes in the direction of a voltage zero crossing lagging the reference time.

6. The network subscriber unit as claimed in claim 1, wherein the control unit is configured to ascertain a base value for the time offset by averaging the determined time offset over a prescribed time period and to control the power exchange based on a difference between the currently determined time offset and the base value.

7. A network subscriber unit for an electrical energy supply network, comprising:
   a control unit configured to control the power exchange of the network subscriber unit with the energy supply network,
   a device configured to determine a voltage zero crossing at a connection point of the network subscriber unit to the energy supply network, and
   a receiving unit configured to receive a signal of a reference time,
   wherein the control unit is configured to determine a time offset between a time of the voltage zero crossing determined by the device and the reference time, and is further configured to control the power exchange based on the time offset,
   wherein the network subscriber unit is configured to accumulate the exchanged power over a prescribed time period weighted with a price factor, wherein the price factor is determined as a function of the time offset.

8. The network subscriber unit as claimed in claim 7, wherein the control unit is configured to determine a bandwidth of the time offset and to scale the price factor based on the bandwidth.

9. A network subscriber unit for an electrical energy supply network, comprising:
   a control unit configured to control the power exchange of the network subscriber unit with the energy supply network,
   a device configured to determine a voltage zero crossing at a connection point of the network subscriber unit to the energy supply network,
   a receiving unit configured to receive a signal of a reference time, and
   an energy store, wherein the control unit is configured to control the power exchange with the energy supply network by means of charging or discharging the energy store,
   wherein the control unit is configured to determine a time offset between a time of the voltage zero crossing determined by the device and the reference time, and is further configured to control the power exchange based on the time offset.

* * * * *